Oct. 8, 1968    T. R. FELLER    3,404,579

TURNING GEAR

Filed April 12, 1967

Inventor
Thomas R. Feller
By John C. Hines
Attorney

United States Patent Office 3,404,579
Patented Oct. 8, 1968

3,404,579
TURNING GEAR
Thomas R. Feller, Milwaukee, Wis., assignor to Allis-Chalmers Manufacturing Company, Milwaukee, Wis.
Filed Apr. 12, 1967, Ser. No. 630,426
4 Claims. (Cl. 74—354)

ABSTRACT OF THE DISCLOSURE

A braking device in combination with a turning gear for slowly rotating large machinery which permits an operator to slowly and precisely move the turning gear into engagement with a driven gear on the shaft of the rotating machinery.

This invention relates to a drive arrangement for rotating the shaft of high temperature rotating machinery such as compressors or elastic fluid turbines so the machine will be evenly heated or cooled prior to being placed in or taken out of operation.

Large high speed compressors run at relatively high temperatures and it is necessary to rotate the compressor shaft at a slow speed before it is completely shut down. This permits the compressor shaft to be cooled uniformly and creeping or sagging of the shaft will be precluded. This slow speed rotation is usually accomplished by means of an electric motor and a speed reducing drive connected to the compressor shaft.

Due to the mass of the rotating elements of large compressors, the gear train of the turning gear must be capable of transmitting high torque. Because of this high torque requirement, the gear train of the turning gear is usually composed of large heavy gears. Furthermore, the drive gear of the turning gear mechanism is, in the preferred arrangement, brought up into engagement from beneath the compressor gear. This permits the turning gear to be thrown out of engagement when the compressor gear exceeds the speed of the turning gear. However, this arrangement has the drawback that the heavy turning gear must be lifted in some manner into engagement with the compressor gear. Furthermore, if the two gears are not properly engaged, they may be damaged and it is therefore necessary to slowly and accurately effect the engagement.

It is the general object of this invention to provide a new and improved turning gear arrangement which permits accurate and easy engagement of the turning gear with the compressor gear.

A more specific object of the invention is to provide a turning gear with a braking device which permits the operator to utilize the turning force of the turning gear to edge that gear into engagement with the compressor gear.

Figure 1:
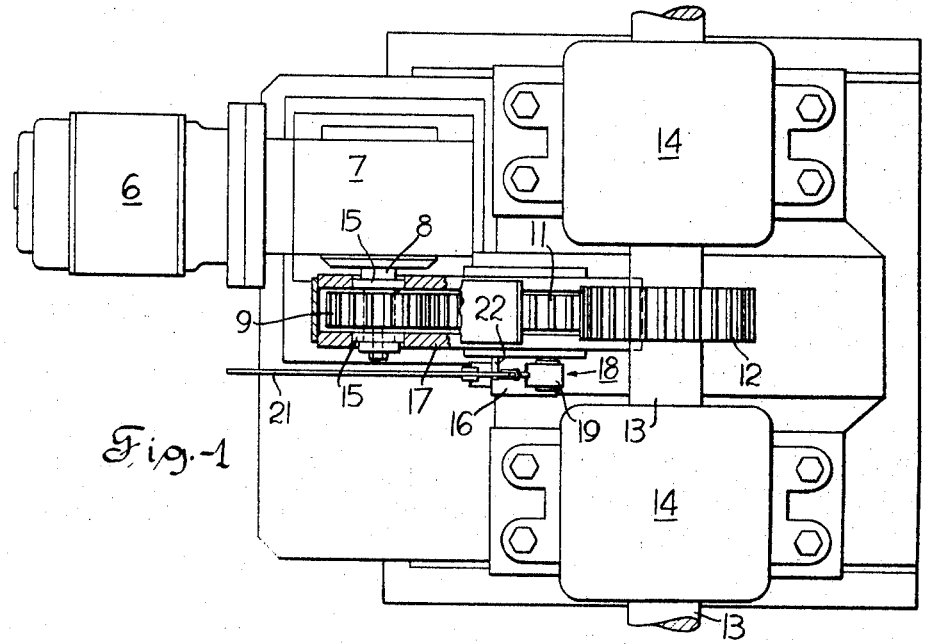
Figure 2:
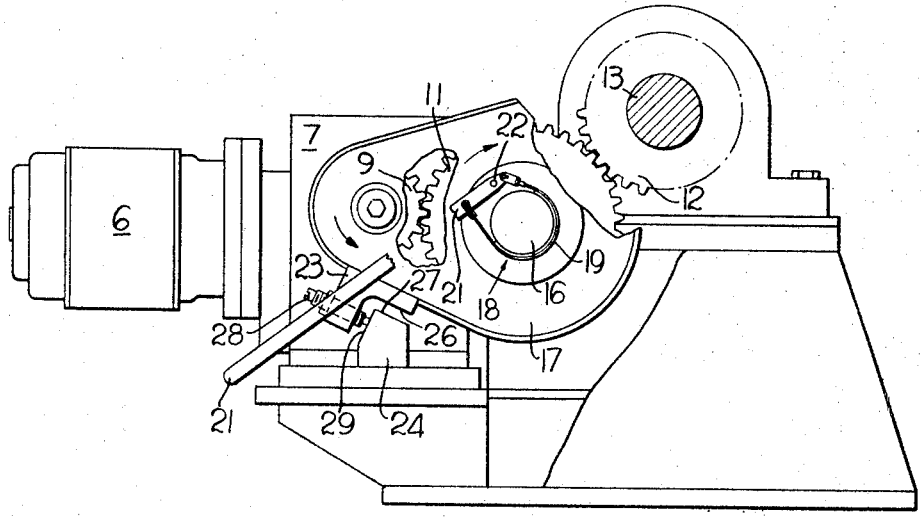

These and other objects of the subject invention will become more fully apparent as the following description is read in light of the attached drawing wherein:

FIG. 1 is a plan view partially broken away, showing a turning gear arrangement constructed in accordance with the invention; and, FIG. 2 is a side elevation of FIG. 1, partially broken away, and partially in section.

Referring to the attached drawing, the driving force for the turning gear mechanism is herein shown for purposes of illustration as an electric motor generally designated 6. The electric motor is connected in driving relation to a conventional gear box generally designated 7. The gear box 7 has an output shaft 8 on which a pinion gear or output driver 9 is connected. The pinion gear 9 is engaged with a drive gear or auxiliary driver 11. The drive gear in turn is engaged with a driven member or gear 12 rigidly connected to a shaft 3. The shaft 13 is journaled in the blocks 14 and is then coupled to one or more rotary machines such as compressors (not shown).

The drive gear 11 is rigidly connected to an idler shaft 16 which is in turn journaled in a pivot casing or support pivot casing 17 to permit encirclement by a braking means generally designated 18. This braking means is herein shown for purposes of illustration as a belt 19 wrapped around the extended portion of drive shaft 16. Opposite ends of the belt 19 are connected to a lever 21 by means of pivot pins. The lever arm is pivotally connected to the pivot casing 17 by means of a pin 22. As herein shown for purposes of illustration only this pivot connection of the lever 21 is more closely adjacent to the free end connection of the braking belt 19 so that the belt is tightened on the shaft 16 as the lever 21 is raised.

The pivot casing 17 is journaled about the output shaft 8 to permit free and relative rotation of the pivot casing about the center of the pinion gear 9. This connection may be made in any conventional manner and is herein shown as including antifriction bearings such as ball-bearings 15 supported in the side walls of the pivot casing 17 and rotatably contained on the output shaft 8. This connection permits the pivot casing 17 to revolve about and relative to the output shaft 8.

The arrows shown in FIG. 2 indicate the direction of rotation of the output gear 9, the drive gear 11, and the compressor driven gear 12.

Two stops are provided to limit the pivotal movement of the pivot casing 17. These stops may be constructed in any conventional manner and are herein shown as including a lug 23 rigidly connected to the pivot casing 17 and a pedestal 24 rigidly connected to the turning gear housing. The lug 23 has a flat portion 26 thereon which engages a flat portion 27 on the pedestal when the drive and compressor gears 11 and 12, respectively, are disengaged. The other stop is shown herein as including an adjusting mechanism. This adjusting mechanism may include a screw threaded stud 28 received in an internally threaded bore in the lug 23. This stud engages a flat surface 29 on the pedestal 24 when the gears 11 and 12 are engaged as shown in FIG. 2. The adjusting arrangement is provided to assure proper blacklash between the drive and driven gears when they are in engagement.

When the compressor (not shown) is running at normal speed, the pivot casing 17 will be resting on the pedestal 24 with the drive gear 11 out of engagement with the compressor driven gear 12. As the speed of the compressor approaches the speed of the drive gear 11, the operator will start to raise the drive gear into engagement with the compressor driven gear. To accomplish this he merely lifts the lever 21 causing the brake band 19 to tighten on the extended portion of the drive shaft 16. This tightening exerts a braking force on the drive shaft which attempts to stop the turning of the drive gear and hence the turning of the output gear 9. Because of the rotation of the output gear and due to the braking force on the drive shaft, the pivot casing will lift up about the output shaft 8 on the bearings 15 and slowly raise into engagement with the compressor driven gear 12. This can be accurately accomplished by only a small effort exerted on the lever 21. The operator can increase or decrease the braking force to slowly and accurately cause engagement between the drive and driven gears. Once the drive gear 11 is engaged with the compressor driven gear and is turning the compressor shaft, it will maintain engagement. This engagement will be maintained due to the tendency of the drive gear 11 to walk up on the teeth of the compressor driven gear 12 which is now attempting to rotate at a slower speed than the drive gear.

When it is desired to start the compressor, the turning gear is brought into engagement with the compressor drive gear in the same manner above described. The turning gear rotates the compressor drive gear until the compressor is properly lubricated. The compressor driving mechanism (not shown) then commences to increase the speed of the compressor and the compressor driven gear 12. Once the speed of the compressor gear 12 exceeds the speed of the drive gear 11, it will throw the drive gear out of engagement permitting the pivot casing 17 to fall down onto the stop on the pedestal 24.

From the above description, it is seen that a relatively simple arrangement for engaging a turning gear with a large rotating machine has been disclosed. Furthermore, it can be seen that this engagement can be effected in a very accurate manner without requiring a large lifting force by the operator. This is due to the manner in which the force of the turning gear itself is utilized to lift the drive gear into engagement with the compressor gear.

Although only one embodiment of the subject invention has been herein shown and described, other embodiments will be obvious after reading this description and all such embodiments as come within a reasonable interpretation of the appended claims are intended to be covered.

The embodiments of the invention in which an exclusive property or privilege is claimed are defined as follows:

1. A turning gear arrangement including a power source for driving the shaft of a rotary machine comprising: a rotatable output driver connected to said power source and being driven thereby; support means pivotally supported coaxially with said output driver in a manner to swing away from said rotary machine shaft under the influence of gravity; a rotatable auxiliary driver engaged with and driven by said output driver journaled in said support means in spaced relation from said pivot; a rotatable driven member rigidly connected to said rotary machine shaft for rotation therewith and positioned for selective engagement by said auxiliary driver; and braking means associated with sid auxiliary driver to selectively resist rotation thereof, the rotation of said output driver being such as to cause said support means to swing about said pivot and bring said auxiliary driver into engagement with said driven member when rotation of said auxiliary driver is resisted.

2. The turning gear arrangement set forth in claim 1 and further comprising adjustable stop means for limiting the extent of movement of said auxiliary driver toward said driven member.

3. The turning gear arrangement set forth in claim 1 wherein said auxiliary driver is fast on an idler shaft and said braking means is a belt wrapped about said idler shaft.

4. The turning gear arrangement set forth in claim 3 and further comprising a lever attached to said belt in a manner to cause said belt to tighten said idler shaft when said lever is raised.

References Cited
UNITED STATES PATENTS

| | | | |
|---|---|---|---|
| 2,896,873 | 7/1959 | Mageoch | 74—354 |
| 3,028,767 | 4/1962 | Moore | 74—354 |
| 3,350,953 | 11/1967 | Stewart | 74—411.5 |

FRED C. MATTERN, Jr., *Primary Examiner.*

H. S. LAYTON, *Assistant Examiner.*